(12) United States Patent
Herz et al.

(10) Patent No.: US 8,004,493 B2
(45) Date of Patent: Aug. 23, 2011

(54) METHODS AND SYSTEMS FOR PROVIDING SENSORY INFORMATION TO DEVICES AND PERIPHERALS

(75) Inventors: Scott Herz, Santa Clara, CA (US); Dan Keen, Cupertino, CA (US); Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 824 days.

(21) Appl. No.: 11/811,174

(22) Filed: Jun. 8, 2007

(65) Prior Publication Data
US 2008/0303681 A1 Dec. 11, 2008

(51) Int. Cl.
*G06F 3/033* (2006.01)
(52) U.S. Cl. ............. 345/158; 381/388; 710/8; 345/901
(58) Field of Classification Search .......... 345/156–184; 710/1–74; 178/18.01–19.07; 381/388; 340/901–904
See application file for complete search history.

(56) References Cited

U.S. PATENT DOCUMENTS

| | | | |
|---|---|---|---|
| 4,081,623 A * | 3/1978 | Vogeley | 379/354 |
| 6,078,825 A * | 6/2000 | Hahn et al. | 455/569.2 |
| 6,520,013 B1 | 2/2003 | Wehrenberg | |
| 6,583,676 B2 | 6/2003 | Krah et al. | |
| 7,599,044 B2 | 10/2009 | Hotelling et al. | |
| 7,653,883 B2 | 1/2010 | Hotelling et al. | |
| 7,688,306 B2 | 3/2010 | Wehrenberg et al. | |
| 2002/0106074 A1* | 8/2002 | Elliott | 379/372 |
| 2002/0132585 A1 | 9/2002 | Palermo et al. | |
| 2002/0175897 A1* | 11/2002 | Pelosi | 345/158 |
| 2002/0193080 A1* | 12/2002 | Komsi et al. | 455/90 |
| 2003/0085870 A1 | 5/2003 | Hinckley | |
| 2003/0095096 A1 | 5/2003 | Robbin et al. | |
| 2004/0192225 A1* | 9/2004 | Mahn | 455/90.1 |
| 2004/0224638 A1 | 11/2004 | Fadell et al. | |
| 2005/0059435 A1* | 3/2005 | McKee et al. | 455/567 |
| 2005/0143124 A1 | 6/2005 | Kennedy et al. | |
| 2006/0017692 A1 | 1/2006 | Wehrenberg et al. | |
| 2006/0052109 A1 | 3/2006 | Ashman, Jr. et al. | |
| 2006/0103733 A1 | 5/2006 | Grady et al. | |

(Continued)

FOREIGN PATENT DOCUMENTS

| | | |
|---|---|---|
| DE | 10148010 A1 | 4/2003 |
| DE | 10202110 A1 * | 4/2003 |
| EP | 0929027 A2 | 7/1999 |
| EP | 1580967 A2 | 9/2005 |
| JP | 63-095661 | 4/1988 |
| JP | 2000-164928 | 6/2000 |
| WO | WO 2006/129290 A1 | 12/2006 |

OTHER PUBLICATIONS

Machine Translation of Eropean Patent Publication DE10202110 to Siemens.*

(Continued)

*Primary Examiner* — Kevin M Nguyen
*Assistant Examiner* — Liliana Cerullo
(74) *Attorney, Agent, or Firm* — Blakely, Sokoloff, Taylor & Zafman LLP

(57) ABSTRACT

Peripherals and data processing systems are disclosed which can be configured to interact based upon sensor data. In at least certain embodiments, a method for sensing motion and orientation information for a device includes receiving a motion event from at least one sensor located in a device. The method further includes determining an orientation for a display of the device. The method further includes determining whether the device is currently moving. The method further includes determining whether the device moves within an angle with respect to a ground reference for a first time period. The method further includes switching the orientation of the display of the device if the device moves in excess of the angle.

38 Claims, 12 Drawing Sheets

U.S. PATENT DOCUMENTS

| | | | |
|---|---|---|---|
| 2006/0121993 A1* | 6/2006 | Scales et al. | 463/48 |
| 2006/0161870 A1 | 7/2006 | Hotelling et al. | |
| 2006/0161871 A1 | 7/2006 | Hotelling et al. | |
| 2006/0290921 A1 | 12/2006 | Hotelling et al. | |
| 2007/0121959 A1* | 5/2007 | Philipp | 381/74 |
| 2008/0140868 A1 | 6/2008 | Kalayjian et al. | |
| 2008/0297474 A1* | 12/2008 | Blomqvist et al. | 345/158 |
| 2009/0088896 A1* | 4/2009 | Tobey | 700/245 |

OTHER PUBLICATIONS

PCT Invitation to Pay Additional Fees for Int'l Application No. PCT/US2008/005819, mailed Aug. 11, 2008 (5 pages).

PCT International Search Report and Written Opinion for International Application No. PCT/US2008/005819, mailed Oct. 8, 2008 (19 pages).

PCT International Preliminary report on Patentability for PCT International Application No. PCT/US2008/005819, mailed Dec. 11, 2009 (11 pages).

Examination Report for European Patent Application No. 08767603.7-1245, dated Dec. 6, 2010, pp. 8 total.

European Search Report for European Patent Application No. 10166111.4-1245, dated Sep. 2, 2010, pp. 8 total.

Examination Report for European Patent Application No. 08767603.7-1245, dated Dec. 6, 2010, pp. 8 total.

European Search Report for European Patent Application No. 10166111.4-1245, dated Sep. 2, 2010, pp. 8 total.

* cited by examiner

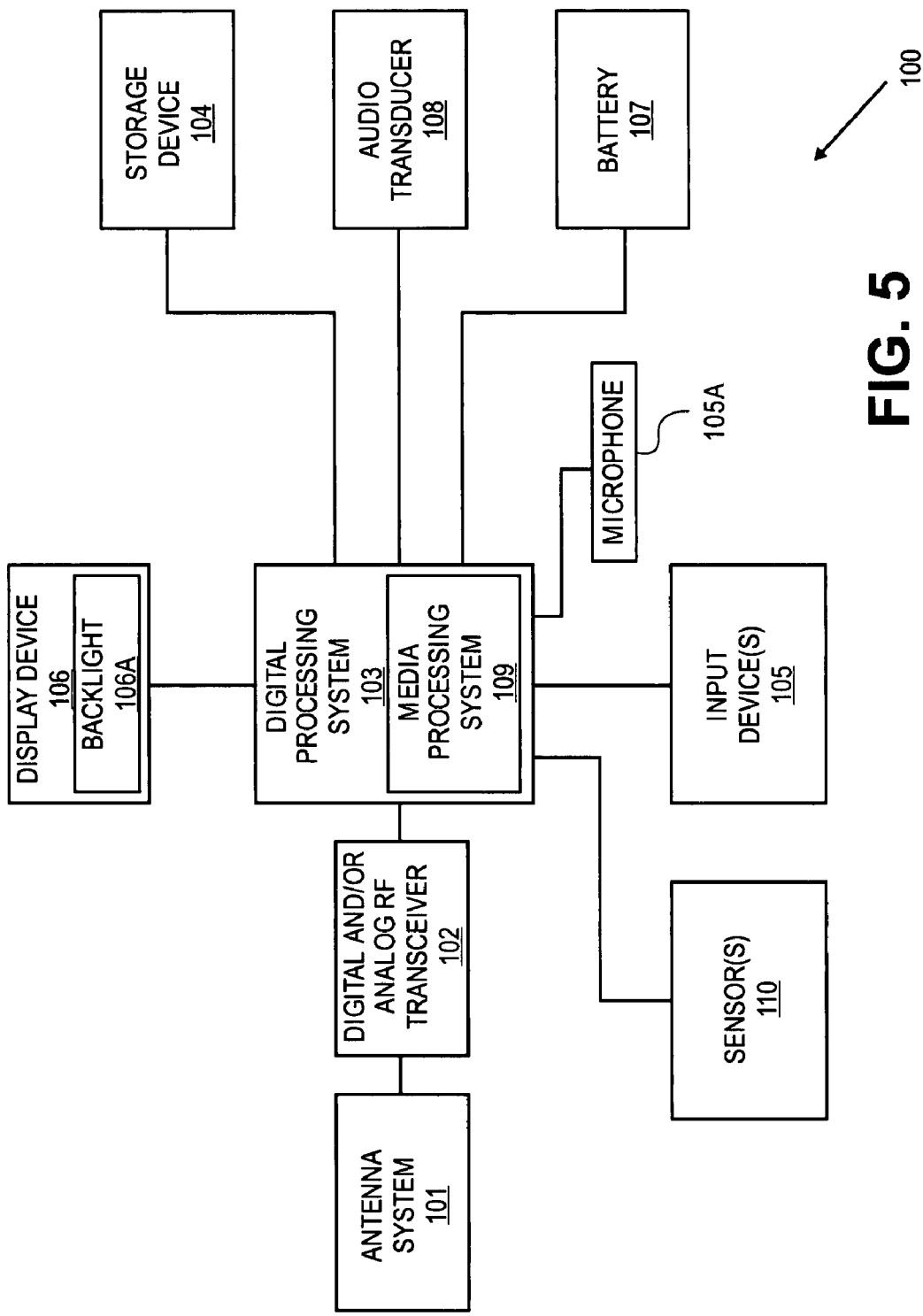

METHODS AND SYSTEMS FOR PROVIDING SENSORY INFORMATION TO DEVICES AND PERIPHERALS

BACKGROUND OF THE INVENTION

Electronic devices, such as computer systems or wireless cellular telephones or other data processing systems, may often be used with peripheral devices. A peripheral device, such as a wired or wireless headset or a wireless or wired keyboard or a wired or wireless cursor control device, is coupled to the electronic device which may be referred to as a host system. The peripheral typically provides input and/or output capabilities to the electronic device.

The peripheral may also be configured to operate with only one particular electronic device or host. For example, a wireless headset peripheral may be paired with a designated wireless cellular telephone so that it communicates with that designated wireless cellular telephone rather than other wireless cellular telephones which are within radio range of the wireless headset. This allows a user to operate the wireless headset with its designated wireless cellular telephone even though it may be surrounded by other wireless cellular telephones which are within the radio range of the wireless headset. Thus, the wireless headset in this case includes some intelligence or data which allows it to selectively operate with a designated host system, but there is no further processing or sensing capability in the wireless headset. A Bluetooth pairing or partnership is an example of a relationship created between a peripheral and a host. It is created by the user in order to exchange information in a secure manner. Creating a Bluetooth partnership between two devices involves entering the same personal identification number (PIN) or passkey on both devices; creating such a partnership is a one-time process. Once a partnership is created, the devices can recognize the partnership and exchange information without entering a PIN again.

Certain electronic devices described previously include sensors for various purposes. However, these sensors (e.g., an accelerometer sensor, a proximity sensor and an ambient light sensor) can not properly detect and distinguish whether an intentional or unintentional user action causes the occurrence of motion and/or orientation information for the device. For example, unintentional movements of a device can trigger improper configurations for the device. An unintentional movement may include a device moving with a user who is jogging or if a user quickly places a device on a surface causing the device to move for a short time period. The sensors are also not able to determine interactions between an associated peripheral and the device.

SUMMARY OF THE DESCRIPTION

At least certain embodiments of the disclosures relate to peripherals which include at least one sensor which senses a state of the peripheral. In these embodiments, a peripheral and/or a host to which it is coupled may be capable of altering one or more configurations of the peripheral or the host or both in response to the data from the at least one sensor.

In at least certain embodiments, a method for sensing motion and orientation information for a device includes receiving a motion event from at least one sensor located in a device. The method further includes determining an orientation for the device. The method further includes determining whether the device is currently moving. The method further includes determining whether the device moves within an angle with respect to a ground reference for a first time period. The method further includes switching the orientation of a display of the device if the device moves in excess of the angle. The method further includes switching the orientation if the device moves within the angle for at least the first time period. The method further includes determining whether the currently moving device moves for a second time period, determining if the orientation is portrait if the device is not moving or if the device moves for at least the second time period, and switching the orientation if the orientation was not portrait.

In at least certain embodiments, a method for sensing an orientation between a device and an associated peripheral includes determining a device vector associated with a device. The device vector indicates an orientation of the device to a ground reference. The method further includes determining a peripheral vector associated with the peripheral of the device. The peripheral vector indicates an orientation of the peripheral to the ground reference. The method further includes generating an audio signal associated with an event from the device. The method further includes determining whether the peripheral vector points towards the device vector in response to the audio signal. The method further includes silencing the audio signal if the peripheral vector points towards the device vector in response to the audio signal.

In at least certain embodiments, a peripheral and its associated data processing system, which may be considered a host system, may be capable of working together to determine a user's intent or actions based on sensor data from at least one sensor on the peripheral or the host or both. For example, a set of sensors (such as, for example, an accelerometer sensor, proximity sensor and an ambient light sensor) on the peripheral may provide data which indicate that the peripheral is not proximate to the user while another set of sensors on the host may provide data which indicate that the host is near to the user's ear. The peripheral may include a peripheral interface to couple the peripheral to the data processing system, at least one peripheral sensor to sense a user of the peripheral; a peripheral processor coupled to the peripheral interface and to the at least one peripheral sensor. The peripheral processor is configured to determine a peripheral vector indicating an orientation of the peripheral to a ground reference. The device may include an interface to couple the device to the peripheral. The device may further include at least one sensor to sense the user, a processor coupled to the interface and to the at least one sensor. The processor is configured to determine a device vector indicating an orientation of the device to the ground reference, initiate an audio signal associated with an event, and determine whether the peripheral vector points towards the device vector in response to the audio signal.

Other systems and methods are also described, and machine readable media, which contain executable instructions to cause a machine to operate as described herein, are also described.

BRIEF DESCRIPTION OF THE DRAWINGS

The present invention is illustrated by way of example and not limitation in the figures of the accompanying drawings in which like references indicate similar elements.

FIG. 5 is a block diagram of a data processing system in which embodiments of the disclosures can be implemented.

DETAILED DESCRIPTION

Figure 1:
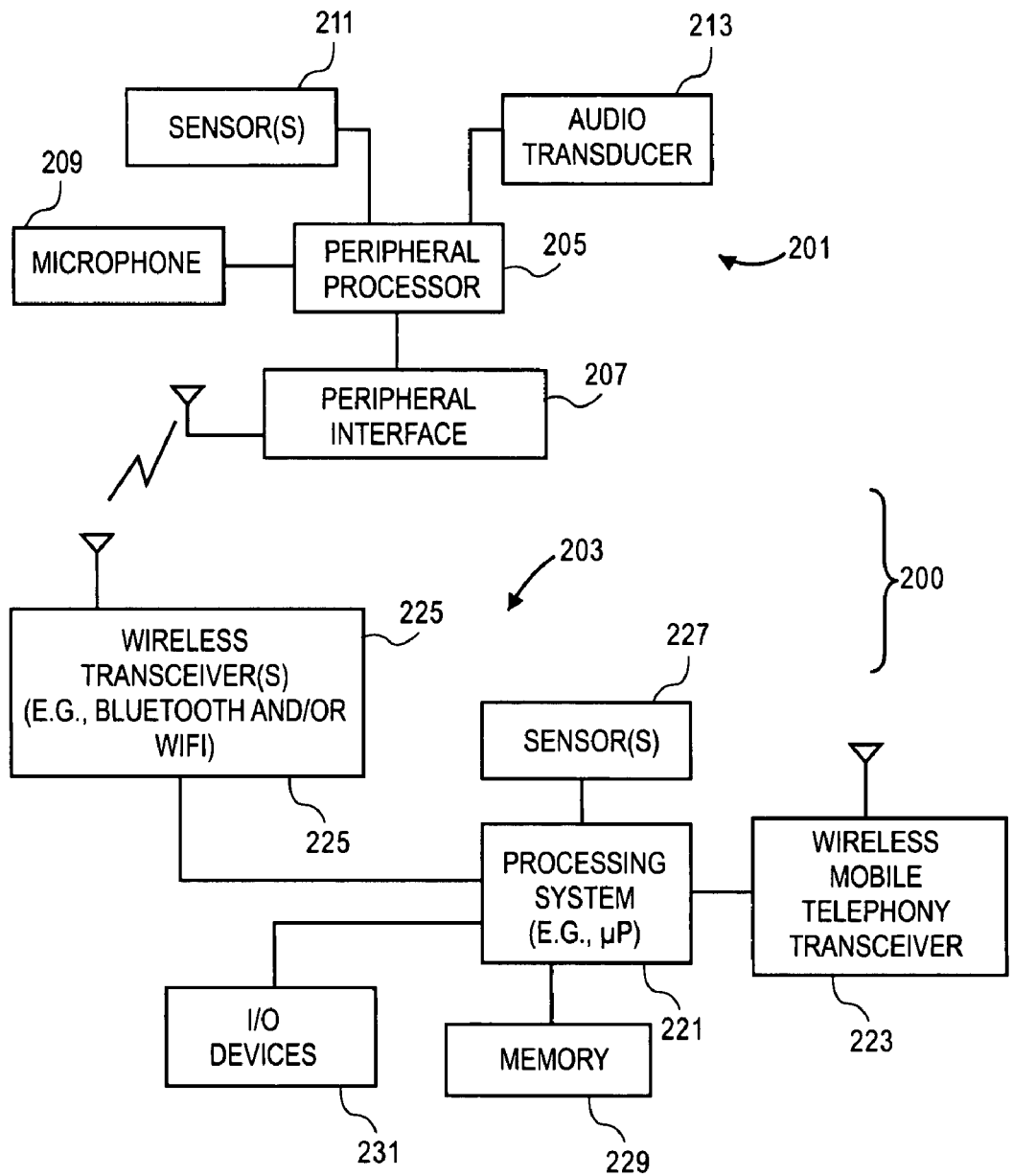
FIG. 1 shows an example of a system which includes an example of a peripheral and an example of a data processing system which is used with the peripheral.

Various embodiments and aspects of the disclosures will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present disclosures.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may include instructions for performing the operations described herein and may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 shows an example of a system 200 which includes a peripheral 201, which may also be referred to as an accessory, and a data processing system 203 which is designed to exchange data with the peripheral 201. In the example of FIG. 1, the peripheral 201 may be a wireless headset which communicates with the data processing system 203 through a wireless personal area network (WPAN) interface, such as a Bluetooth interface, and the data processing system 203 may be a wireless mobile cellular telephone or a personal digital assistant (PDA) which also includes a wireless mobile cellular telephone or a general purpose computer system, such as a handheld computer which includes a wireless mobile cellular telephone. It will be appreciated that while a particular type of peripheral and a particular type of data processing system are shown in FIG. 1, other types of peripherals and data processing systems may be used in alternative embodiments. For example, in alternative embodiments, a peripheral may be a wired headset or a wired or wireless keyboard or a wired or wireless cursor control device or other wired or wireless input or output devices; in other cases, the peripheral may be considered to be a data processing device which is similar to a PDA or cellular telephone or general purpose computer system. In alternative embodiments, the data processing system may be a general purpose computer system, or special purpose computer system, or an entertainment system, or a PDA or an embedded device within another device, or a media player, etc. The peripheral 201 includes a peripheral processor 205 which is coupled to one or more sensors 211, an audio transducer 213 (which may be a speaker), a microphone 209, and a wireless transceiver 207. The peripheral processor 205 controls the operation of peripheral 201 by operating the wireless transceiver 207, which may be, for example, a Bluetooth or WiFi transceiver or other types of transceivers used to create a wireless local area network (WLAN) or a WPAN, and by operating the microphone 209 and the audio transducer 213, in response to signals from the wireless transceiver and/or the sensors and/or processes executing on the peripheral processor 205. The peripheral processor 205 may be coupled to audio codes (not shown) or other devices to drive or receive input from the audio transducer and the microphone respectively. In the case where peripheral 201 is a wireless headset for a telephone, the wireless transceiver 207 establishes a wireless communication link with a telephone which acts as a host data processing system and which sends audio data to be played by the speaker (audio transducer 213) and which receives audio data from the microphone 209. Thus, the wireless headset acts in the same manner as a wired headset on a telephone. The sensors 211 may be one or more sensors on the peripheral 201 which are designed to detect or measure user activity or a device context. The sensors 211 may include, for example, a proximity sensor and/or an ambient light sensor and/or an accelerometer and/or other sensors described herein. The sensor(s) 211 provides sensor data (e.g. proximity data) to the peripheral processor 205 which may process this data or may transmit, as described below, the sensor data to the data processing system for processing.

The data processing system 203 includes a processing system 221, such as a set of one or more microprocessors, which is coupled to a wireless mobile telephony transceiver 223; the wireless mobile telephony transceiver 223 may be a wireless mobile cellular telephone transceiver which is, to at least some extent, controlled by the processing system 221. In one embodiment, the data processing system 203 may be a handheld PDA or handheld general purpose computer which includes a wireless cellular telephone. In this case, the RF circuitry needed for the wireless cellular telephone may be provided by the wireless mobile telephony transceiver 223. The data processing system 203 also includes one or more sensors 227, memory 229, I/O devices 231 and at least one additional wireless transceiver 225, each of which are coupled to the processing system 221. The processing system 221 may include a set of one or more microprocessors which are coupled to the rest of the data processing system 203 through one or more buses. The one or more sensors 227 may be located on the data processing system 203 and may be designed to detect or measure user activity or a device context as explained further in U.S. patent application Ser. No. 11/638,251, which is incorporated herein by reference. The one or more sensors 227 may include, for example, a proximity sensor and/or an ambient light sensor and/or an accelerometer and/or other sensors described herein. The sensor data from these one or more sensors 227 is provided to the processing system 221 which may process this data or may transmit this sensor data to the peripheral for processing, as described herein, or both of the peripheral and the processing system 221 may process the sensor data. The I/O (input/output) devices 231 may include one or more of (a) a keyboard; (b) a touch input panel; (c) a cursor control device (such as, e.g., a joystick or trackpad); (d) speaker; (e) microphone; (f) buttons (such as, e.g., "send" and "end" or other buttons for a cellular telephone); (g) a display device; and (h) other known input/output devices. In one embodiment, a touch input panel may be integrated with a display device to provide both input and output capabilities on the same surface of the display device; this is described further below. These I/O devices allow a user to enter instructions or commands or data to the processing system 221 to cause the system to operate in a manner desired by the user. The memory 229 may be any combination of DRAM or flash memory or other types of memory including, for example, a magnetic hard drive, and the memory 229 may be coupled to the processing system through one or more memory controllers; the memory 229 may store computer program instructions, including a computer operation system (OS) and user application programs, such as, for example, a web browser application, an email application, a calendar program, an address book application, and other possible applications. The memory 229 may also store user data such as, for example, address and/or contact information, calendar information (e.g. events and tasks), bookmarks/favorites (e.g. "URLs") and other user data (e.g. word processing documents, spreadsheets, presentations, etc.). The processing system 221 may retrieve and store computer program instructions and data from the memory 229 in order to allow the user to operate the data processing system 203. Moreover, the memory 229 may store music and/or other media for playback on the data processing system 203, which can allow the user to display and select music and/or other media for playback on a speaker (e.g. an earphone) or a wireless headset of a peripheral, such as peripheral 201. The wireless transceiver(s) 225 may include one or more wireless transceivers which provide wireless connectivity to other devices, such as the peripheral 201 or a wireless network (e.g. a WiFi network or other wireless local area networks (WLAN) or a wireless personal area network (WPAN), etc.). The wireless transceiver(s) 225 are coupled to the processing system 221 to provide data to the data processing system 203. In one embodiment, the wireless transceiver(s) 225 include a Bluetooth compliant transceiver to couple wirelessly the data processing system 203 to the peripheral 201 and optionally other peripherals (e.g. a wireless keyboard) and a WiFi compliant transceiver (e.g. IEEE 802.11 a/g compliant transceiver) to wirelessly couple the system 203 to a wireless network and/or other devices. The peripheral 201 and the data processing system 203 may be paired together using known techniques, such as the techniques described herein, to create a Bluetooth partnership. The pairing may alternatively involve other techniques which register one device with another device to provide a secure, authenticated communication channel between the peripheral 201 and the data processing system 203.

In one embodiment, the peripheral 201 and the data processing system 203 may be capable of working together to determine a user's intent or actions or the system's context based on sensor data from at least one sensor on the peripheral 201 or the data processing system 203 or both. For example, a set of sensors, such as, for example, a proximity sensor and an ambient light sensor on the peripheral may provide data which indicate that the peripheral is not proximate to the user, while another set of sensors on the host may provide data which indicate that the host is near to the user's ear; in this situation, the peripheral and the host may exchange data, such as data from the sensors and instructions which automatically cause a change in configuration of the peripheral and/or the host in response to the sensor data. If, in this example, the peripheral is a wireless headset and the host is a wireless cellular telephone, then the peripheral may transmit its sensor data to the host which processes this sensor data along with sensor data from the host to determine various configurations for the host and/or peripheral. For example, a proper orientation (e.g., landscape or portrait) for the wireless cellular telephone may be determined based on the peripheral sensing that the user is lying down while viewing the wireless cellular telephone.

In some embodiments, the peripheral 201 may include a peripheral interface 207 to couple the peripheral 201 to a device such as the data processing system 203 and at least one peripheral sensor 211 to sense a user of the peripheral 201. The peripheral 201 may further include a peripheral processor 205 coupled to the peripheral interface 207 and to the at least one peripheral sensor 211. The peripheral processor 205 is configured to determine a peripheral vector indicating an orientation of the peripheral 201 to a ground reference while being worn by a user. The device may include an interface 225 to couple the device to the peripheral 201. The device may further include at least one sensor 227 to sense the user, a processor 221 coupled to the interface 225 and to the at least one sensor 227. The processor 221 is configured to determine a device vector indicating an orientation of the device to the ground reference, initiate an audio signal associated with an event or events (e.g., a calendar event, a phone call, an alarm event, a to do event, an email event, and/or a reminder event) and determine whether the peripheral vector points towards the device vector in response to the audio signal. The peripheral vector points towards the device vector in response to the audio signal based on the peripheral vector not pointing towards the device vector prior to the audio signal being generated.

In at least certain embodiments, the processor 221 is further configured to ignore the audio signal if the peripheral vector does not point towards the device vector in response to the audio signal. For example, the peripheral vector may not point towards the device vector in response to the audio signal if the peripheral vector points towards the device vector prior to and after the audio signal is generated. In this example, no change in the direction of the peripheral vector occurs in response to the audio signal.

In some embodiments, the peripheral interface 207 includes a wireless transceiver which wirelessly couples the device to the peripheral 201. The peripheral 201 further includes a speaker or audio transducer 213 coupled to the peripheral interface 207 and a microphone 209 coupled to the peripheral interface 207. The wireless transceiver transmits first audio data from the microphone 209 to the device. The wireless transceiver receives second audio data from the device and passes the second audio data to the speaker. The device includes a wireless mobile telephone transceiver 223.

In one embodiment, at least one of the peripheral processor 205 and the processor 221 receive data from at least one of the at least one peripheral sensor 211 and the at least one sensor 227 and determine, based on the data, whether to use the speaker and the microphone 209 for a phone call communicated through the wireless mobile telephone transceiver. The at least one peripheral sensor 211 includes at least one of (a) a proximity sensor; (b) an ambient light sensor; (c) a temperature sensor; (d) an accelerometer; (e) a position sensor; (f) an orientation sensor; and (g) a sound sensor; and wherein the at least one sensor comprises at least one of (a) a proximity sensor; (b) an ambient light sensor; (c) a temperature sensor; (d) an accelerometer; (e) a position sensor; (f) an orientation sensor; and (g) a sound sensor. The peripheral processor 211 may configure the speaker and the processor 221 automatically in response to outputs from the at least one peripheral sensor 211 and the at least one sensor 227.

At least certain embodiments of the disclosures may include a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Embodiments of the disclosures described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 2A:
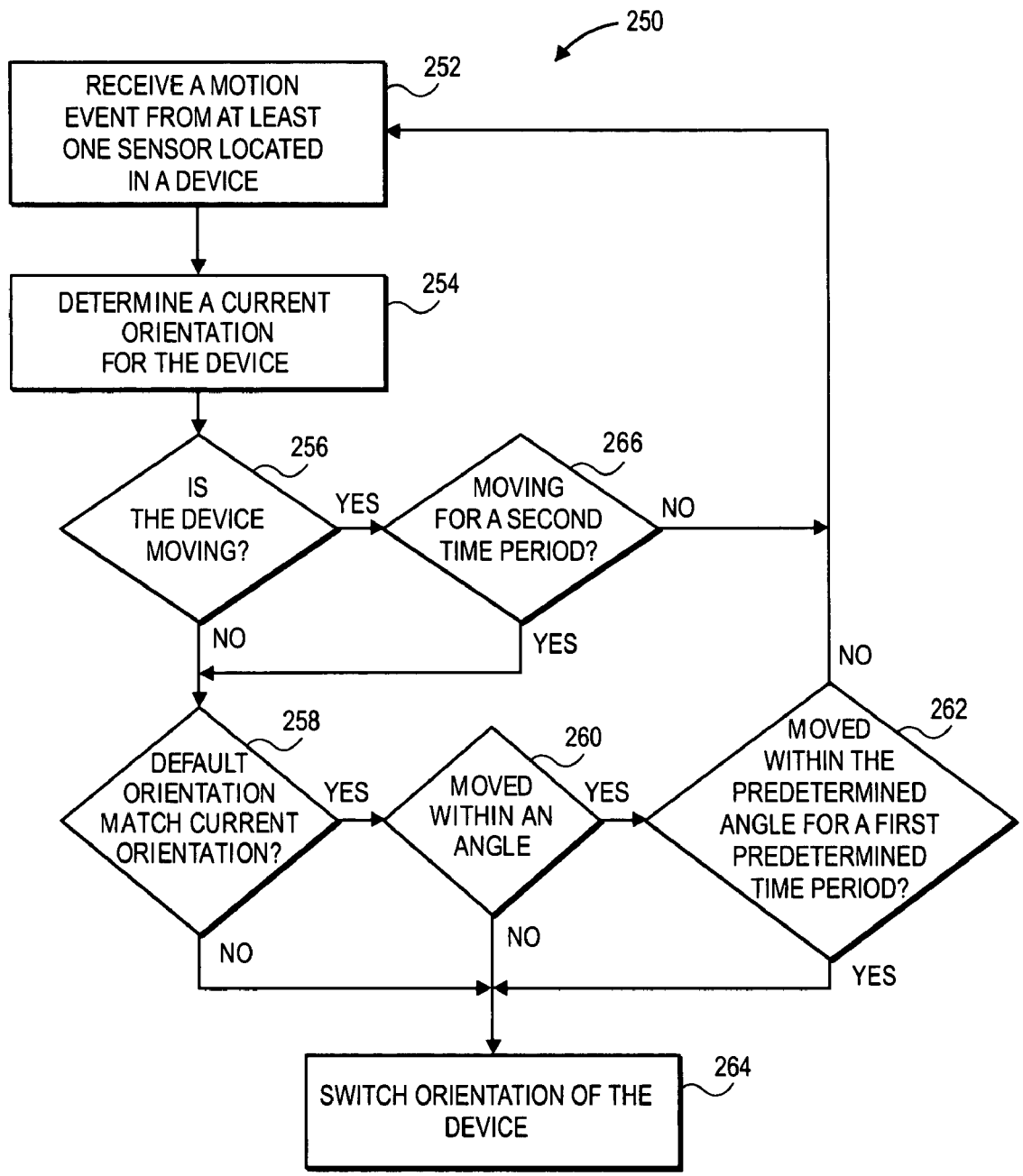
FIG. 2A is a flow chart of an embodiment of a method of the disclosures described herein.

FIG. 2A is a flow chart of an embodiment of a method of the disclosures described herein. In at least certain embodiments, a method 250 senses motion and orientation information for a display of a device. For example, a user may be using the device to browse the internet. Determining the proper orientation of the display such as landscape or portrait ensures that content being browsed is displayed in accordance with the aspect ratio of the display. The method 250 includes receiving a motion event from at least one sensor located in a device at block 252. For example, an accelerometer sensor may sense motion in an X, Y, and/or Z axis direction. The method 250 further includes determining a current orientation for the device at block 254. The method 250 further includes determining whether the device is currently moving at block 256. The accelerometer may provide the previous X, Y, and Z information with the current X, Y, and/or Z information to a processor, which compares the X, Y, and Z information with a threshold value(s) to determine if the device is moving.

In one embodiment, if the device is not currently moving at block 256, then a previous or a default orientation (e.g., portrait, landscape, upside down, face up, face down, or ambiguous) is determined at block 258. For example, portrait may be the default orientation. If the current orientation has changed compared to the previous or default orientation, then a software application being used by the device receives a message or call to switch the orientation to the current orientation of the device at block 264.

In another embodiment, if the device has a portrait orientation at block 258, then the method 250 further includes determining whether the device moved based on the event at 252 within a shallow angle (e.g., 20-30 degree shallow angle) with respect to a ground reference at block 260. If not, then the software application receives a message or call to switch the device orientation at block 264 because presumably an intentional action of the user caused a motion event forming an angle greater than the shallow angle with respect to the ground reference.

In some embodiments, if it is determined that the device forms a shallow angle with respect to the ground reference for a first time period at block 262, then the software application receives a message or call to switch the orientation at block 264 because presumably an intentional action of the user caused a motion event forming a shallow angle with respect to the ground reference for at least the first time period. Alternatively, a device that spends a short time less than the first time period within the shallow angle of the ground reference is likely to have been accidentally placed in this position. In this example, the method 250 returns to block 252 to wait for a new motion event.

Returning to block 256, the method 250 further includes determining whether the currently moving device (block 256) moves for a second time period at block 266. If the movement occurs for at least the second time period, then the method 250 continues to block 258 because presumably the movement occurring for more than the second time is likely an intentional user action. Otherwise, the method 250 continues back to block 252 to wait for a new motion event.

In at least certain embodiments, the method 250 determines a proper orientation of a display of a device as discussed above. The method 250 enables a proper orientation of the display to avoid an accidental switch from one orientation to another. For example, an accidental or unintentional switch may occur based on a user dropping a device, sliding a device across a table, or running with a device causing a sensor in the device to mistakenly believe the orientation has changed based on motion information being sensed.

Figure 2B:
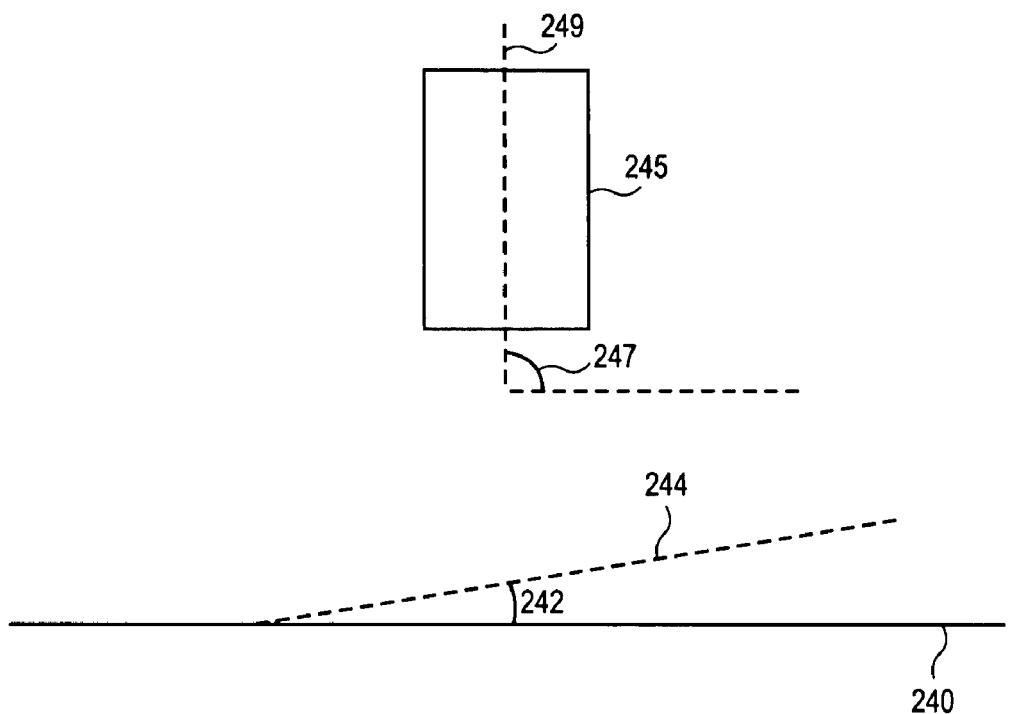
FIG. 2B shows a view of a data processing system (e.g. a wireless mobile cellular telephone) in relation to a ground reference in an embodiment of the disclosures described herein.

FIG. 2B shows a view of a data processing system (e.g., a device such as a wireless mobile cellular telephone) in relation to a ground reference in an embodiment of the disclosures described herein. A data processing system 245 having an imaginary axis 249 forms an angle 247 with respect to a ground reference 240 (e.g., ground, floor, table, shelf, horizontal surface). The method 250 has a shallow angle 242 formed between an imaginary line 249 and the ground reference 240. For example, at block 260 the method 250 determines whether the device moved based on the event at 252 within a shallow angle (e.g., 20-30 degree shallow angle) with respect to a ground reference. In FIG. 2B, the device 250 forms the angle 247 that exceeds the shallow angle 242. In this example, the orientation switches because the event causing the angle 247 is likely an intentional action. However, FIG. 2C illustrates a potentially accidentally action.

Figure 2C:
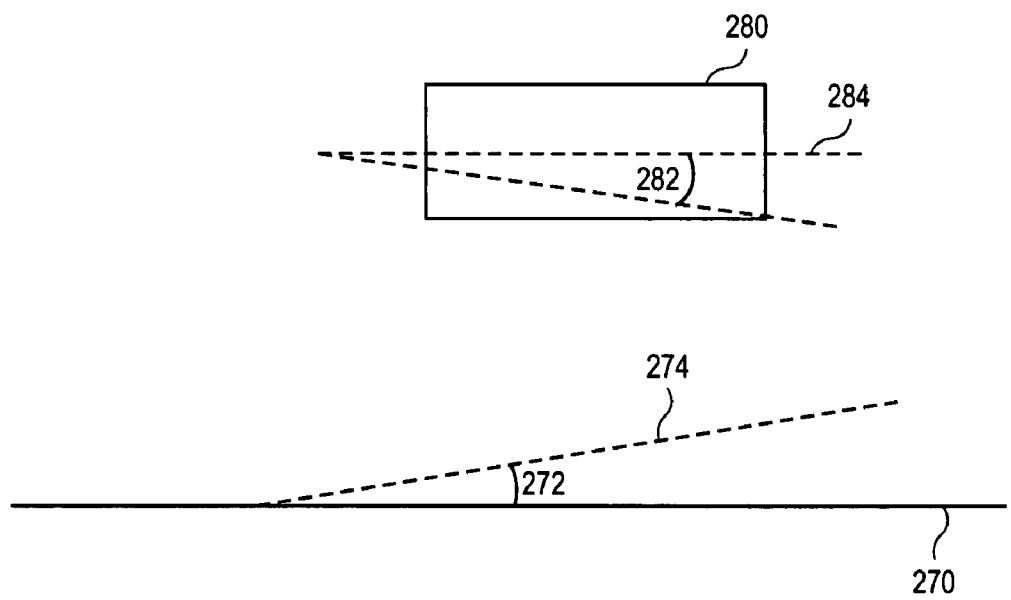
FIG. 2C shows a view of a data processing system (e.g. a wireless mobile cellular telephone) in relation to a ground reference in another embodiment of the disclosures described herein.

FIG. 2C shows a view of a data processing system (e.g. a wireless mobile cellular telephone) in relation to a ground reference in another embodiment of the disclosures described herein. A data processing system 280 having an imaginary axis 284 forms an angle 282 with respect to a ground reference 270 (e.g., ground, floor, table, shelf, horizontal surface). The method 250 has a shallow angle 272 formed between an imaginary line 274 and the ground reference 240. The device 280 forms the angle 282 within the shallow angle 272. In this example, the orientation will only switch if the device spends a sufficient amount of time (first time period at block 262) in order for the event causing the angle 282 to be an intentional action.

Figure 3A:
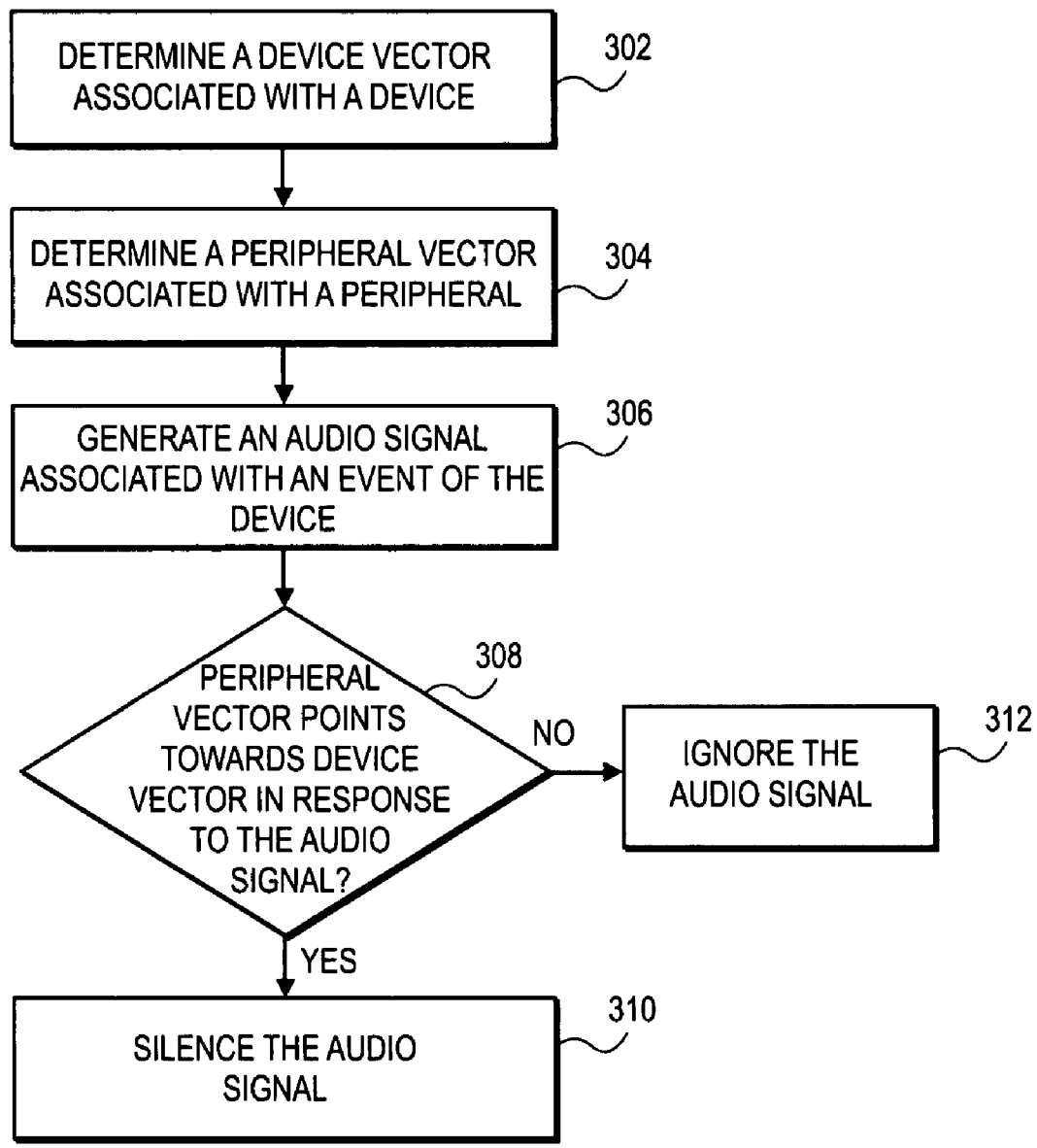
FIG. 3A is a flow chart of an embodiment of a method of the disclosures described herein.

FIG. 3A is a flow chart of an embodiment of a method of the disclosures described herein. The method 300 includes determining a device vector associated with a device at block 302. The device vector indicates an orientation of the device to a ground reference. The method 300 further includes determining a peripheral vector associated with a peripheral of the device at block 304. The peripheral vector indicates an orientation of the peripheral to the ground reference. The method 300 further includes generating an audio signal associated with an event (e.g., a calendar event, a phone call, an alarm event, a to do event, an email event, and/or a reminder event) of the device at block 306. The method 300 further includes determining whether the peripheral vector points towards the device vector in response to the audio signal at block 308. The method 300 further includes silencing the audio signal at block 310 if the peripheral vector points towards the device vector in response to the audio signal. For example, the peripheral vector points towards the device vector in response to the audio signal based on the peripheral vector not pointing towards the device vector prior to the audio signal being generated and then pointing towards the device vector during the generation of the audio signal.

The method 300 further includes ignoring the audio signal at block 312 if the peripheral vector does not point towards the device vector in response to the audio signal. For example, the peripheral vector does not point towards the device vector in response to the audio signal based on the peripheral vector pointing towards the device vector prior to and during the generating of the audio signal. Alternatively, if the peripheral vector points away from the device vector prior to and during the generation of the audio signal, then the audio signal will not be silenced.

Figure 3B:
FIG. 3B shows a view of a device vector in relation to a peripheral vector in an embodiment of the disclosures described herein.

FIG. 3B shows a view of a device vector in relation to a peripheral vector in an embodiment of the disclosures described herein. The device vector 320 points away from the peripheral vector 322.

Figure 3C:
FIG. 3C shows a view of a device vector in relation to a peripheral vector in another embodiment of the disclosures described herein.

FIG. 3C shows a view of a device vector in relation to a peripheral vector in another embodiment of the disclosures described herein. The device vector 324 points towards the peripheral vector 326.

In some embodiments, as discussed at block 308, a peripheral vector may point towards the device vector in response to the audio signal. For example, FIG. 3B may represent an initial time period with the device and peripheral vectors pointing away from each other. Then, an audio signal is generated associated with an event from the device as discussed at block 306. In response to the audio signal, a user wearing the peripheral turns towards the device which is illustrated by the vectors in FIG. 3C. Then, the audio signal generated by the device would be silenced as discussed at block 310.

In one embodiment, the audio signal discussed in FIG. 3A represents a voice command. A user may acknowledge the voice command by nodding up and down in which case the peripheral vector moves in a vertical direction with respect to a ground reference. Alternatively, a user may reject the voice command by nodding from side to side in which case the peripheral vector moves in a horizontal direction with respect to the ground reference.

In another embodiment, a user is using a software application to browse the internet. The combination of device and peripheral vectors can result in the device knowing that the user is currently viewing content such as a web page from the internet. In this example, the device may be configured with a default time period(s) before the device is locked and/or the display of the device is dimmed. Based on the device knowing that the user is currently viewing the web page, the device can change the previously discussed time period(s) to create a more satisfactory user experience without the user having to change the default time period(s).

In another embodiment, a user is lying on a horizontal surface (e.g., couch, floor, etc.) while interacting and/or looking at the device. A device vector may indicate that an axis 249 of the device is parallel to a ground reference and thus a display of the device should be presented in a landscape orientation. However, if the device knows that the user is lying on the horizontal surface based on a peripheral vector, then it may be preferable for the device to remain in a portrait orientation.

Figure 4A:
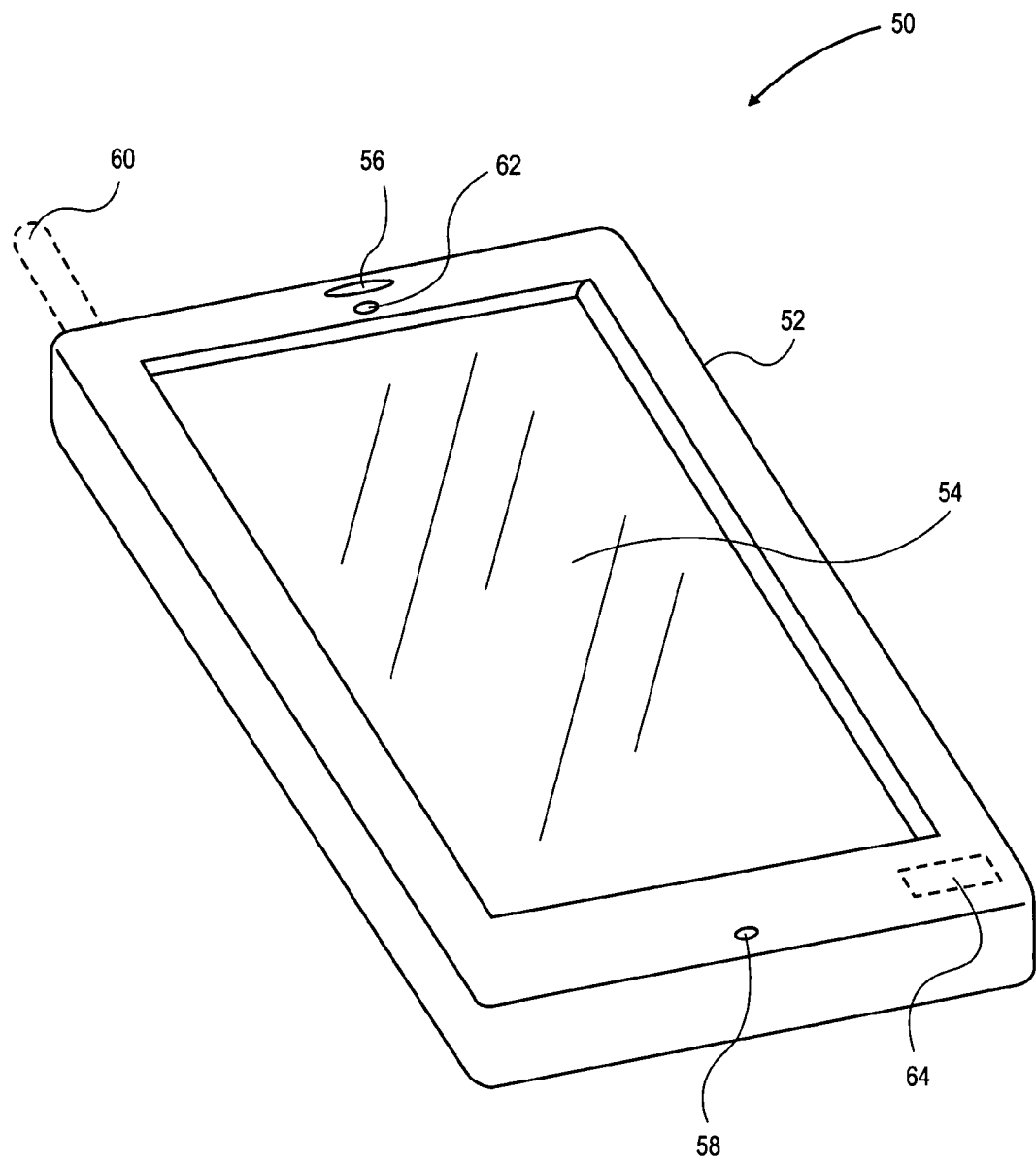
FIG. 4A is a perspective view of a portable data processing system in accordance with one embodiment of the disclosures described herein.

FIG. 4A shows a portable device 50 in accordance with one embodiment of the invention. The portable device 50 may include a housing 52, a display/input device 54, a speaker 56, a microphone 58 and an optional antenna 60 (which may be visible on the exterior of the housing or may be concealed within the housing). The portable device 50 also may include a proximity sensor 62 and an accelerometer 64 and optionally other sensors (e.g. an ambient light sensor). The portable device 50 may be a cellular telephone or a device which is an integrated PDA and a cellular telephone or a device which is an integrated media player and a cellular telephone or a device which is both an entertainment system (e.g. for playing games) and a cellular telephone, or the portable device 50 may be other types of devices described herein. In one particular embodiment, the portable device 50 may include a cellular telephone and a media player and a general purpose computer, all contained within the housing 52. The portable device 50 may be implemented as an embodiment of the data processing system 203 shown in FIG. 1 and may operate with a peripheral in a manner which is shown in FIG. 1 and is described in the present disclosures. The portable device 50 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, as shown in FIG. 4A, the display/input device 54 occupies a large portion of one surface (e.g. the top surface) of the housing 52 of the portable device 50. In one embodiment, the display/input device 54 consumes substantially the entire front surface of the portable device 50. In another embodiment, the display/input device 54 consumes, for example, at least 75% of a front surface of the housing 52 of the portable device 50. In alternative embodiments, the portable device 50 may include a display which does not have input capabilities, but the display still occupies a large portion of one surface of the portable device 50. In this case, the portable device 50 may include other types of input devices such as a QWERTY keyboard or other types of keyboard which slide out or swing out from a portion of the portable device 50.

Figure 4B:
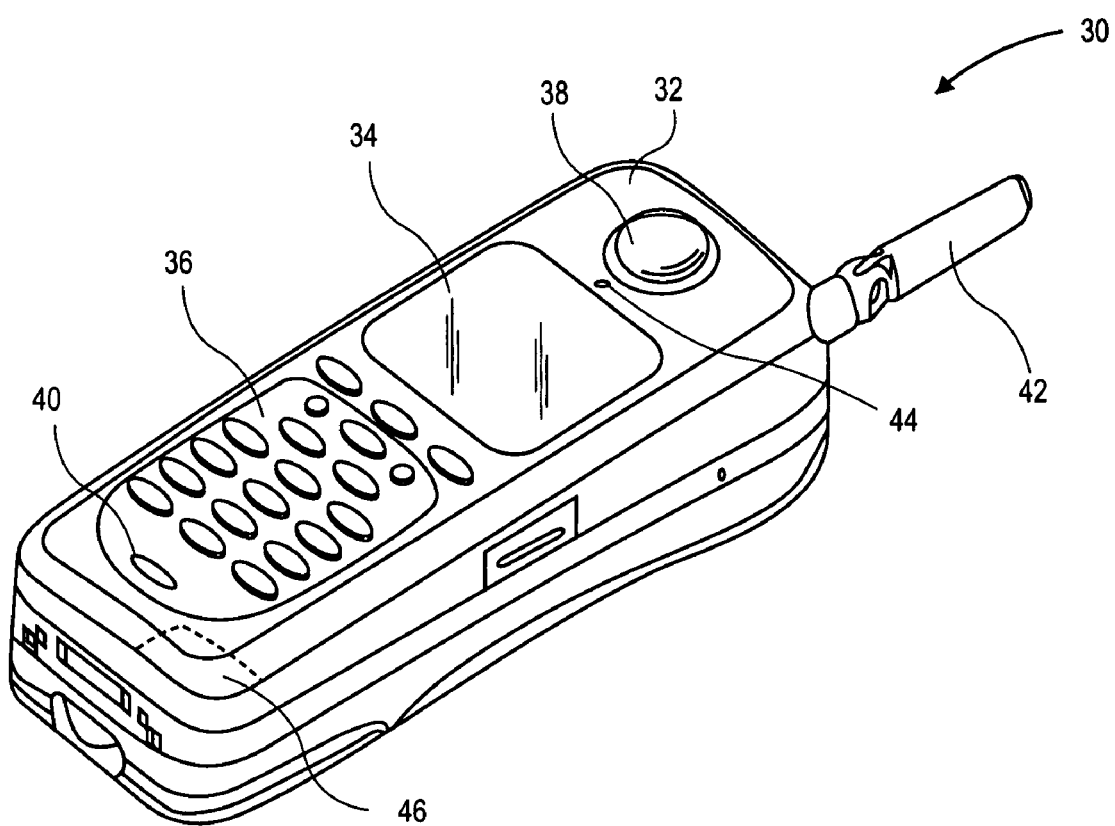
FIG. 4B is a perspective view of a portable data processing system in accordance with one embodiment of the disclosures described herein.

FIG. 4B illustrates a data processing system according to one embodiment of the invention; this data processing system of FIG. 4B may be implemented as an embodiment of the data processing system 203 shown in FIG. 1. FIG. 4B shows a wireless device in a telephone configuration having a "candy-bar" style. In FIG. 4B, the wireless device 30 may include a housing 32, a display device 34, an input device 36 which may be an alphanumeric keypad, a speaker 38, a microphone 40 and an antenna 42. The wireless device 30 also may include a proximity sensor 44 and an accelerometer 46. It will be appreciated that the embodiment of FIG. 4B may use more or fewer sensors and may have a different form factor from the form factor shown in FIG. 4B.

The display device 34 is shown positioned at an upper portion of the housing 32, and the input device 36 is shown positioned at a lower portion of the housing 32. The antenna 42 is shown extending from the housing 32 at an upper portion of the housing 32. The speaker 38 is also shown at an upper portion of the housing 32 above the display device 34. The microphone 40 is shown at a lower portion of the housing 32, below the input device 36. It will be appreciated that the speaker 38 and microphone 40 can be positioned at any location on the housing, but are typically positioned in accordance with a user's ear and mouth, respectively. The proximity sensor 44 is shown at or near the speaker 38 and at least partially within the housing 32. The accelerometer 46 is shown at a lower portion of the housing 32 and within the housing 32. It will be appreciated that the particular locations of the above-described features may vary in alternative embodiments.

The display device 34 may be, for example, a liquid crystal display (LCD) which does not include the ability to accept inputs or a touch input screen which also includes an LCD. The input device 36 may include, for example, buttons, switches, dials, sliders, keys or keypad, navigation pad, touch pad, touch screen, and the like.

Any well-known speaker, microphone and antenna can be used for speaker 38, microphone 40 and antenna 42, respectively.

Figure 6:
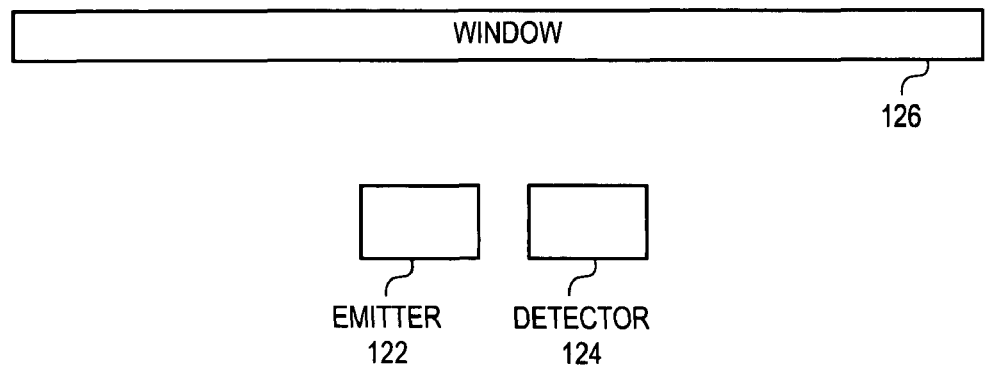
FIG. 6 is a schematic side view of a proximity sensor in accordance with one embodiment of the disclosures described herein.

The proximity sensor 44 may detect location (e.g. distance from the wireless device 30), direction, speed, etc. of objects relative to the wireless device 30. A location of an object relative to the wireless device can be represented as a distance in at least certain embodiments. The proximity sensor may generate location or movement data or both, which may be used to determine the location of objects relative to the portable device 30 and/or proximity sensor 44. An example of a proximity sensor is shown in FIG. 6.

In addition, a processing device (not shown) is coupled to the proximity sensor(s) 44. The processing device may be used to determine the location of objects relative to the portable device 30 or proximity sensor 44 or both based on the location and/or movement data provided by the proximity sensor 44. The proximity sensor may continuously or periodically monitor the object location. The proximity sensor may also be able to determine the type of object it is detecting.

Additional information about proximity sensors can be found in U.S. patent application Ser. No. 11/241,839, titled "PROXIMITY DETECTOR IN HANDHELD DEVICE," and U.S. patent application Ser. No. 11/240,788, titled "PROXIMITY DETECTOR IN HANDHELD DEVICE;" U.S. patent application Ser. No. 11/165,958, titled "METHODS AND APPARATUS FOR REMOTELY DETECTING PRESENCE," filed Jun. 23, 2005; and U.S. Pat. No. 6,583,676, titled "PROXIMITY/TOUCH DETECTOR AND CALIBRATION CIRCUIT," issued Jun. 24, 2003, all of which are incorporated herein by reference in their entirety.

According to one embodiment, the accelerometer 46 is able to detect a movement including an acceleration or de-acceleration of the wireless device. The accelerometer 46 may generate movement data for multiple dimensions, which may be used to determine a direction of movement of the wireless device. For example, the accelerometer 46 may generate X, Y and Z axis acceleration information when the accelerometer 46 detects that the portable device is moved. In one embodiment, the accelerometer 46 may be implemented as described in U.S. Pat. No. 6,520,013, which is incorporated herein by reference in its entirety. Alternatively, the accelerometer 46 may be a KGF01 accelerometer from Kionix or an ADXL311 accelerometer from Analog Devices or other accelerometers which are known in the art.

In addition, a processing device (not shown) is coupled to the accelerometer(s) 46. The processing device may be used to calculate a direction of movement, also referred to as a movement vector of the wireless device 30. The movement vector may be determined according to one or more predetermined formulas based on the movement data (e.g., movement in X, Y and Z) provided by accelerometer 46. The processing device may be integrated with the accelerometer 46 or integrated with other components, such as, for example, a chipset of a microprocessor, of the portable device.

The accelerometer 46 may continuously or periodically monitor the movement of the portable device. As a result, an orientation of the portable device prior to the movement and after the movement may be determined based on the movement data provided by the accelerometer attached to the portable device.

Additional information about accelerometers can be found in co-pending U.S. patent application Ser. No. 10/986,730, filed Nov. 12, 2004, which is hereby incorporated herein by reference in its entirety.

The data acquired from the proximity sensor 44 and the accelerometer 46 can be combined together, or used alone, to gather information about the user's activities. The data from the proximity sensor 44, the accelerometer 46 or both can be used, for example, to activate/deactivate a display backlight, initiate commands, make selections, control scrolling or other movement in a display, control input device settings, or to make other changes to one or more settings of the device. For example, an orientation of the display 34 can be altered based on one or more sensors of the device 30. Information from a peripheral as shown in FIG. 1 can alter settings in the device 30 such as silencing an alarm generated by the device 30 if the peripheral vector changes direction in response to the alarm.

Figure 4C:
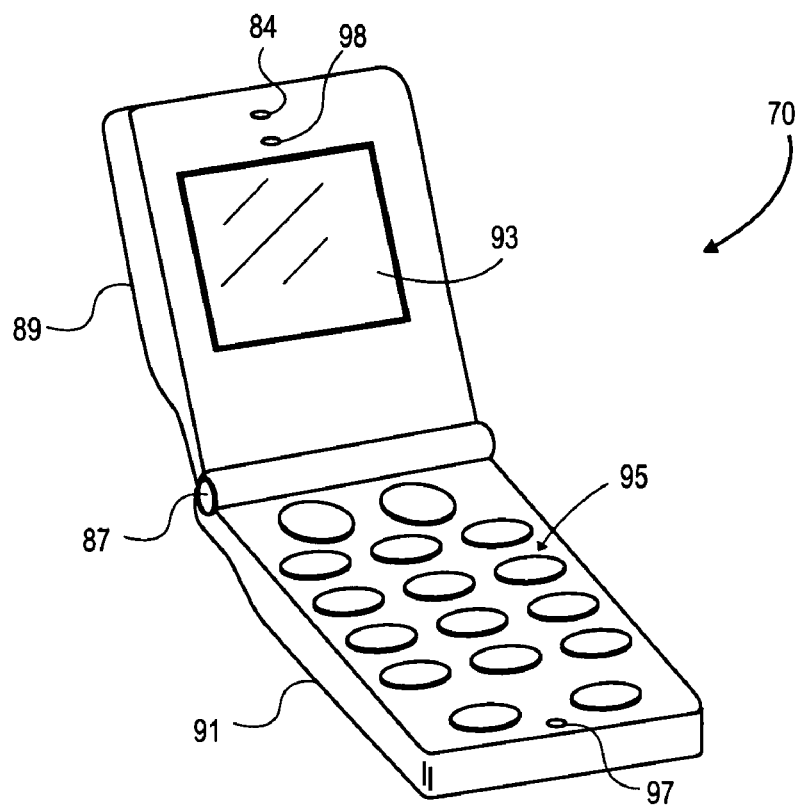
FIG. 4C is a perspective view of a portable data processing system in a first configuration (e.g. in an opened configuration) in accordance with one embodiment of the disclosures described herein.
Figure 4D:
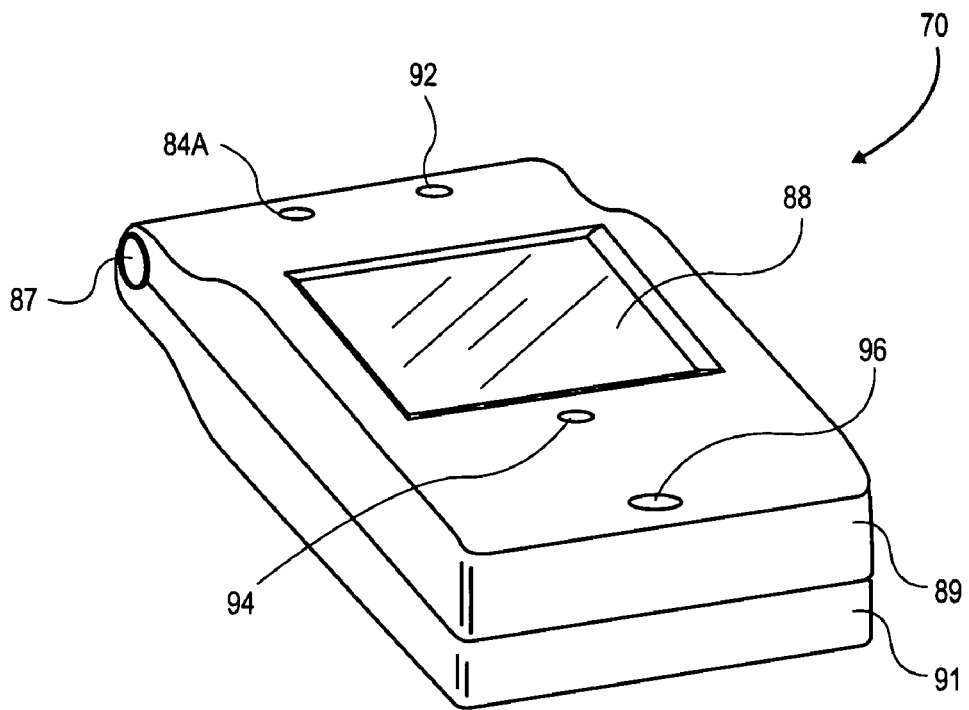
FIG. 4D is a perspective view of a portable data processing system in a second configuration (e.g. in a closed configuration) in accordance with one embodiment of the disclosures described herein.

FIGS. 4C and 4D illustrate a portable device 70 according to one embodiment of the invention. The portable device 70 may be implemented as an embodiment of the data processing system 203 shown in FIG. 1 and may operate with a peripheral in a manner which is shown in FIGS. 3A-3C and is described relative to FIGS. 3A-3C and the present disclosures. The portable device 70 may be a cellular telephone which includes a hinge 87 that couples a display housing 89 to a keypad housing 91. The hinge 87 allows a user to open and close the cellular telephone so that it can be placed in at least one of two different configurations shown in FIGS. 4C and 4D. In one particular embodiment, the hinge 87 may rotatably couple the display housing to the keypad housing. In particular, a user can open the cellular telephone to place it in the open configuration shown in FIG. 4C and can close the cellular telephone to place it in the closed configuration shown in FIG. 4D. The keypad housing 91 may include a keypad 95 which receives inputs (e.g. telephone number inputs or other alphanumeric inputs) from a user and a microphone 97 which receives voice input from the user. The display housing 89 may include, on its interior surface, a display 93 (e.g. an LCD) and a speaker 98 and a proximity sensor 84; on its exterior surface, the display housing 89 may include a speaker 96, a temperature sensor 94, a display 88 (e.g. another LCD), an ambient light sensor 92, and a proximity sensor 84A. Hence, in this embodiment, the display housing 89 may include a first proximity sensor on its interior surface and a second proximity sensor on its exterior surface. The first proximity sensor may be used to detect a user's head or ear being within a certain distance of the first proximity sensor and to cause an illumination setting of displays 93 and 88 to be changed automatically in response to this detecting (e.g. the illumination for both displays are turned off or otherwise set in a reduced power state). Data from the second proximity sensor, along with data from the ambient light sensor 92 and data from the temperature sensor 94, may be used to detect that the cellular telephone has been placed into the user's pocket.

In at least certain embodiments, the portable device 70 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

Each of the devices shown in FIGS. 4A, 4B, 4C and 4D may be a wireless communication device, such as a wireless cellular telephone, and may include a plurality of components which provide a capability for wireless communication. FIG. 5 shows an embodiment of a wireless device 100 which includes the capability for wireless communication. The wireless device 100 may be included in any one of the devices shown in FIGS. 4A, 4B, 4C and 4D, although alternative embodiments of those devices of FIGS. 4A, 4B, 4C and 4D may include more or fewer components than the wireless device 100. Furthermore, all or portions of wireless device 100 may be implemented as part of data processing system 203, and wireless device 100 may operate with a peripheral in a manner which is described in the present disclosures.

Wireless device 100 may include an antenna system 101. Wireless device 100 may also include a digital and/or analog radio frequency (RF) transceiver 102, coupled to the antenna system 101, to transmit and/or receive voice, digital data and/or media signals through antenna system 101.

Wireless device 100 may also include a digital processing system 103 to control the digital RF transceiver and to manage the voice, digital data and/or media signals. Digital processing system 103 may be a general purpose processing device, such as a microprocessor or controller for example. Digital processing system 103 may also be a special purpose processing device, such as an ASIC (application specific integrated circuit), FPGA (field-programmable gate array) or DSP (digital signal processor). Digital processing system 103 may also include other devices, as are known in the art, to interface with other components of wireless device 100. For example, digital processing system 103 may include analog-to-digital and digital-to-analog converters to interface with other components of wireless device 100. Digital processing system 103 may include a media processing system 109, which may also include a general purpose or special purpose processing device to manage media, such as files of audio data.

Wireless device 100 may also include a storage device 104, coupled to the digital processing system, to store data and/or operating programs for the wireless device 100. Storage device 104 may be, for example, any type of solid-state or magnetic memory device.

Wireless device 100 may also include one or more input devices 105, coupled to the digital processing system 103, to accept user inputs (e.g., telephone numbers, names, addresses, media selections, etc.) Input device 105 may be, for example, one or more of a keypad, a touchpad, a touch screen, a pointing device in combination with a display device or similar input device.

Wireless device 100 may also include at least one display device 106, coupled to the digital processing system 103, to display information such as messages, telephone call information, contact information, pictures, movies and/or titles or other indicators of media being selected via the input device 105. Display device 106 may be, for example, an LCD display device. The display device 106 may include a backlight 106a to illuminate the display device 106 under certain circumstances. It will be appreciated that the wireless device 100 may include multiple displays.

Wireless device 100 may also include a battery 107 to supply operating power to components of the system including digital RF transceiver 102, digital processing system 103, storage device 104, input device 105, microphone 105A, audio transducer 108, media processing system 109, sensor(s) 110, and display device 106. Battery 107 may be, for example, a rechargeable or non-rechargeable lithium or nickel metal hydride battery.

Wireless device 100 may also include audio transducers 108, which may include one or more speakers, and at least one microphone 105A.

Wireless device 100 may also include one or more sensors 110 coupled to the digital processing system 103. The sensor(s) 110 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. One or more of such sensors may also be included on a peripheral which is configured to operate with (e.g. exchange data with) the data processing system. Based on the data acquired by the sensor(s) 110 and sensor(s) on a peripheral, various responses may be performed automatically by the data processing system or the peripheral or both, such as, for example, changing an orientation of the display, silencing an audio signal, activating or deactivating the backlight 106a, changing a setting of the input device 105 (e.g. switching between processing or not processing, as an intentional user input, any input data from an input device), and other responses and combinations thereof.

In one embodiment, digital RF transceiver 102, digital processing system 103 and/or storage device 104 may include one or more integrated circuits disposed on a printed circuit board (PCB).

Figure 7:
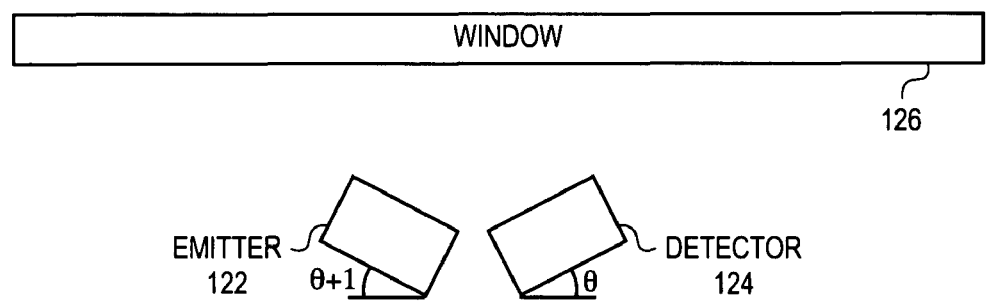
FIG. 7 is a schematic side view of an alternative proximity sensor in accordance with one embodiment of the disclosures described herein.

FIGS. 6 and 7 illustrate exemplary proximity sensors in accordance with embodiments of the invention. It will be appreciated that, in alternative embodiments, other types of proximity sensors, such as capacitive sensors or sonar-like sensors, may be used rather than the proximity sensors shown in FIGS. 6 and 7. In FIG. 6, the proximity sensor 120 includes an emitter 122, a detector 124, and a window 126. The emitter 122 generates light in the infrared (IR) bands, and may be, for example, a Light Emitting Diode (LED). The detector 124 is configured to detect changes in light intensity and may be, for example, a phototransistor. The window 126 may be formed from translucent or semi-translucent material. In one embodiment, the window 126 is an acoustic mesh, such as, for example, a mesh typically found with a microphone or speaker of the portable device. In other embodiments, the window 126 may be MicroPerf, IR transparent strands wound in a mesh, or a cold mirror.

During operation, the light from the emitter 122 hits an object 128 and scatters when the object is present above the window 126. The light from the emitter may be emitted in square wave pulses which have a known frequency, thereby allowing the detector 124 to distinguish between ambient light and light from emitter 122 which is reflected by an object, such as the user's head or ear or a material in a user's pocket, back to the detector 124. At least a portion of the scattered light is reflected towards the detector 124. The increase in light intensity is detected by the detector 124, and this is interpreted by a processing system (not shown in FIG. 6) to mean an object is present within a short distance of the detector 124. If no object is present or the object is beyond a certain distance from the detector 124, an insufficient or smaller amount of the emitted light is reflected back towards the detector 124, and this is interpreted by the processing system (not shown in FIG. 6) to mean that an object is not present or is at a relatively large distance. In each case, the proximity sensor is measuring the intensity of reflected light which is related to the distance between the object which reflects the light and detector 124.

In one embodiment, the emitter 122 and detector 124 are disposed within the housing of a portable device or a peripheral, such as those described in the present disclosures.

In FIG. 7, the emitter 122 and detector 124 of the proximity sensor are angled inward towards one another to improve detection of the reflected light, but the proximity sensor of FIG. 7 otherwise operates in a manner similar to the proximity sensor of FIG. 6.

It will be appreciated that at least some of the sensors which are used with embodiments of the disclosures may determine or provide data which represents an analog value. In other words, the data represents a value which can be any one of a set of possible values which can vary continuously or substantially continuously, rather than being discrete values which have quantum, discrete jumps from one value to the next value. Further, the value represented by the data may not be predetermined. For example, in the case of a distance measured by a proximity sensor, the distance is not predetermined, unlike values of keys on a keypad which represent a predetermined value. For example, a proximity sensor may determine or provide data that represents a distance which can vary continuously or nearly continuously in an analog fashion; in the case of such a proximity sensor, the distance may correspond to the intensity of reflected light which originated from the emitter of the proximity sensor. A temperature sensor may determine or provide data that represents a temperature, which is an analog value. A light sensor, such as an ambient light sensor, may determine or provide data that represents a light intensity which is an analog value. A motion sensor, such as an accelerometer, may determine or provide data which represents a measurement of motion (e.g. velocity or acceleration or both). A gyroscope may determine or provide data which represents a measurement of orientation (e.g. amount of pitch or yaw or roll). A sound sensor may determine or provide data which represents a measurement of sound intensity. For other types of sensors, the data determined or provided by the sensor may represent an analog value.

Figure 8:
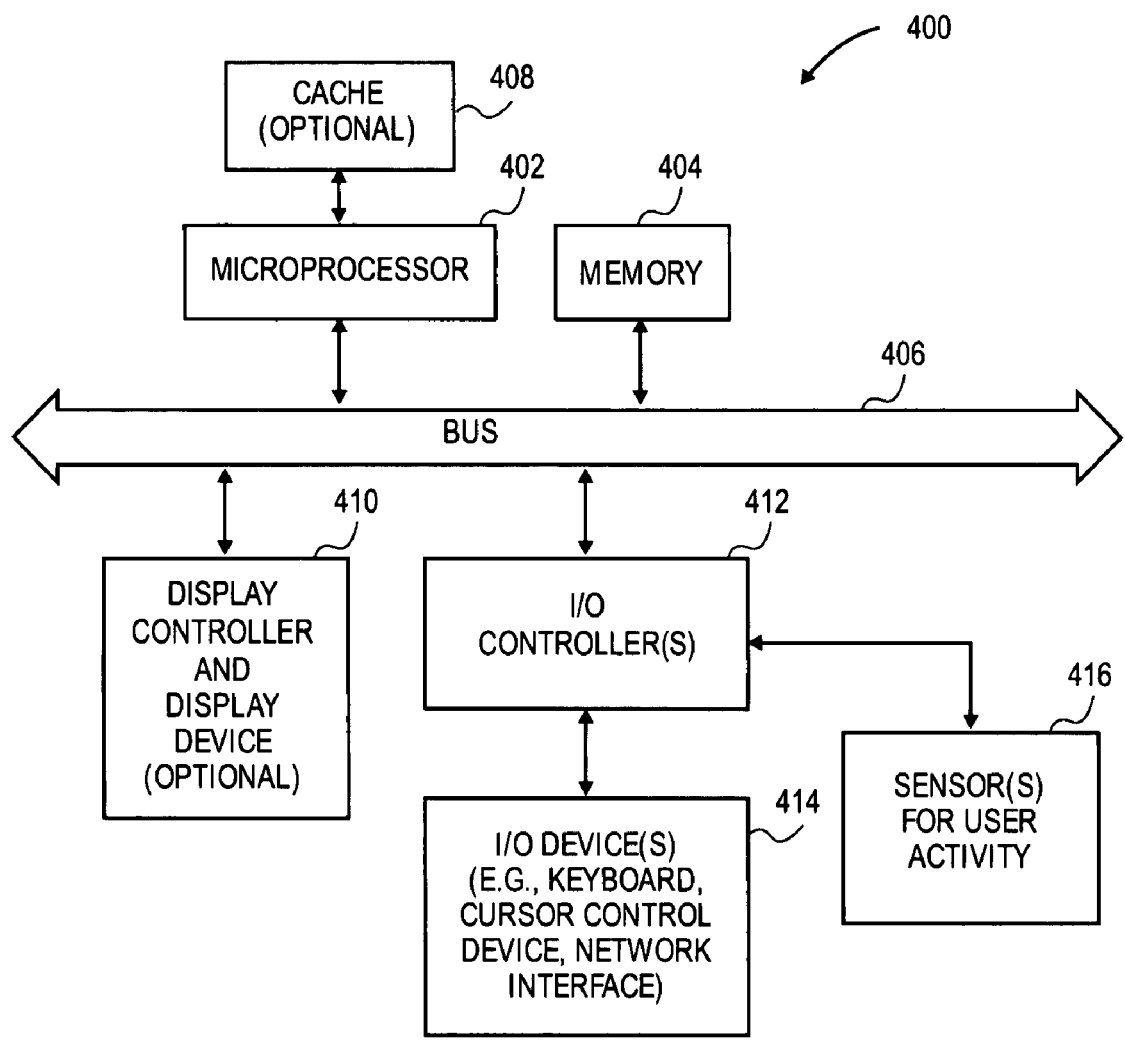
FIG. 8 shows, in block diagram form, an example of a data processing system which may be used with one or more embodiments described herein.

FIG. 8 shows another example of a device according to an embodiment of the disclosures. This device may include a processor, such as microprocessor 402, and a memory 404, which are coupled to each other through a bus 406. The device 400 may optionally include a cache 408 which is coupled to the microprocessor 402. This device may also optionally include a display controller and display device 410 which is coupled to the other components through the bus 406. One or more input/output controllers 412 are also coupled to the bus 406 to provide an interface for input/output devices 414 and to provide an interface for one or more sensors 416 which are for sensing user activity. The bus 406 may include one or more buses connected to each other through various bridges, controllers, and/or adapters as is well known in the art. The input/output devices 414 may include a keypad or keyboard or a cursor control device such as a touch input panel. Furthermore, the input/output devices 414 may include at least one network interface which is either for a wired network or a wireless network (e.g. an RF transceiver such as a WiFi or WPAN RF transceiver). The sensors 416 may be any one of the sensors described herein including, for example, a proximity sensor or an ambient light sensor. In at least certain implementations of the device 400, the microprocessor 402 may receive data from one or more sensors 416 and may perform the analysis of that data in the manner described herein. For example, the data may be analyzed and the microprocessor 402 may then automatically cause an adjustment in one or more settings of the device.

In at least certain embodiments, the data processing system 400 includes at least one sensor 416 to sense whether the data processing system 400 moves within an angle with respect to a ground reference for a first time period. The system 400 further includes a processor 402 coupled to the at least one sensor 416. The processor 402 is configured to respond to data received from the at least one sensor 416 by switching an orientation of the data processing system 400 if the data processing system 400 moves in excess of the angle.

The processor 402 may be further configured to switch the orientation if the device moves within the angle for at least the first time period in response to data from the at least one sensor 416. The processor 402 may be configured in response to data from the at least one sensor 416 to determine the orientation for the data processing system 400, determine whether the data processing system 400 moves based on a current position changing in comparison to a last position of the data processing system. The processor 402 may be further configured to determine whether the data processing system 400 moves for a time period, determine if the orientation is portrait if the data processing system 400 is not moving or if the data processing system moves for at least the second time period, and switch the orientation if the data processing system 400 orientation was not portrait. The orientation may include a portrait, a landscape counterclockwise, a landscape clockwise, an upside down, a face up, a face down, and an ambiguous orientation.

Figure 9:
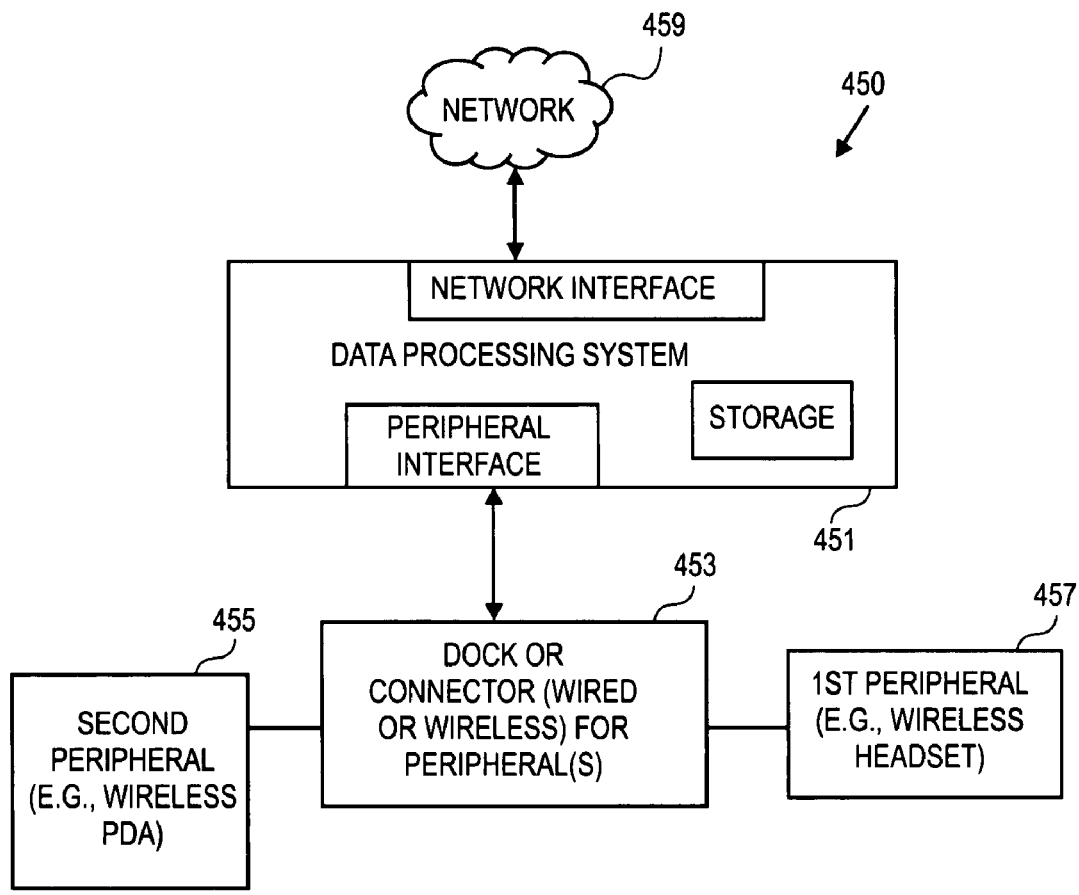
FIG. 9 shows, in block diagram form, a data processing system with two peripherals and a dock or other connector which couples the peripherals to the data processing system.

FIG. 9 relates to another aspect of the disclosures described herein. In this aspect, the data processing system 203 may be considered itself a peripheral relative to another data processing system such as the data processing system 451 which may, in at least certain embodiments, be a general purpose computer system such as the system shown in FIG. 8. The system 450 shown in FIG. 9 includes the data processing system 451 which includes a network interface and a peripheral interface and storage. In at least certain embodiments, the data processing system 451 may be a general purpose computer system having a keyboard, and a cursor control device, and a display as well as a network interface to couple the data processing system to a network 459 which may be the Internet or other networks, such as a local area network or a telephone network or a cable TV system network. The network interface may connect to the network either through a wired connection or through a wireless connection and there may be a plurality of network interfaces for different networks or different methods of connecting to the same network or a plurality of networks. The data processing system typically includes non-volatile mass storage which may store user programs and an operating system and user data including address or contact information, calendar information, and URLs such as favorites or bookmarks for browsing the Internet. The peripheral interface of the data processing system 451 is used to couple the data processing system 451 to a dock or other connector for peripherals. The dock or other connector may be connected in a wired or wireless manner to the data processing system 451 through the peripheral interface. The dock or connector 453 is designed to connect to one or more peripherals, such as a first peripheral 457 which may be a wireless headset and a second peripheral 455 which may be a wireless cellular telephone which includes PDA functionality. In one embodiment, the data processing system 203 may be the second peripheral 455 and the peripheral 201 may be the first peripheral 457. The dock may mechanically hold both peripherals separately or at the same time and may also electrically connect to both peripherals to provide power to the peripherals, recharge the batteries of the peripherals, and to exchange data between the peripherals and the data processing system 451. The second peripheral 455 may include storage for user information, such as contacts, calendar, and URLs, which may be synchronized with the user's data of a similar type on the data processing system 451. The user may place one or both peripherals on the dock or connector 453 to cause certain actions to occur as described herein or may remove one or both peripherals to also cause certain actions to occur automatically as described herein. The dock and/or peripherals may include mechanical or electrical sensors to detect the placement of the peripheral on the dock or connector and the removal of the peripheral from the dock or connector.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    determining a device vector associated with a device, the device vector indicates an orientation of the device including a direction with respect to a horizontal ground reference;
    determining a peripheral vector associated with a peripheral of the device, the peripheral vector indicates an orientation of the peripheral including a direction with respect to the horizontal ground reference;
    generating an audio signal associated with an event from the device; and
    determining whether the peripheral vector and the device vector point towards each other in response to the audio signal.

2. The method of claim 1, further comprising:
    silencing the audio signal when the peripheral vector points towards the device vector in response to the audio signal.

3. The method of claim 2, wherein the peripheral vector points towards the device vector in response to the audio signal based on the peripheral vector not pointing towards the device vector prior to the audio signal being generated.

4. The method of claim 2, further comprising:
    ignoring the audio signal when the peripheral vector does not point towards the device vector in response to the audio signal.

5. The method of claim 4, wherein the peripheral vector does not point towards the device vector in response to the audio signal based on the peripheral vector pointing towards the device vector prior to and after the audio signal is generated.

6. The method of claim 1, wherein determining of the peripheral vector occurs based on a user wearing the peripheral.

7. The method of claim 1, wherein the event comprises at least one of: a calendar event, a phone call, an alarm event, a to do event, an email event, and a reminder event.

8. The method of claim 1, wherein the audio signal represents a voice command.

9. The method of claim 8, further comprising:
    acknowledging the voice command if the peripheral vector moves in a vertical direction with respect to a ground reference.

10. The method of claim 9, further comprising:
rejecting the voice command if the peripheral vector moves in a horizontal direction with respect to the ground reference.

11. A machine readable non-transitory medium storing executable program instructions which when executed cause a data processing system to perform a method comprising:
determining a device vector associated with a device, the device vector indicates an orientation of the device including a direction with respect to a horizontal ground reference;
determining a peripheral vector associated with a peripheral of the device, the peripheral vector indicates an orientation of the peripheral including a direction with respect to the horizontal ground reference;
generating an audio signal associated with an event from the device; and
determining whether the peripheral vector and the device vector point towards each other in response to the audio signal.

12. The machine readable non-transitory medium of claim 11, further comprising:
silencing the audio signal when the peripheral vector points towards the device vector in response to the audio signal.

13. The machine readable non-transitory medium of claim 12, wherein the peripheral vector points towards the device vector in response to the audio signal based on the peripheral vector not pointing towards the device vector prior to the audio signal being generated.

14. The machine readable non-transitory medium of claim 12, further comprising:
ignoring the audio signal when the peripheral vector does not point towards the device vector in response to the audio signal.

15. The machine readable non-transitory medium of claim 14, wherein the peripheral vector does not point towards the device vector in response to the audio signal based on the peripheral vector pointing towards the device vector prior to and after the audio signal is generated.

16. The machine readable non-transitory medium of claim 11, wherein determining of the peripheral vector occurs based on a user wearing the peripheral.

17. The machine readable non-transitory medium of claim 11, wherein the event comprises at least one of: a calendar event, a phone call, an alarm event, a to do event, an email event, and a reminder event.

18. The machine readable non-transitory medium of claim 11, wherein the audio signal represents a voice command.

19. The machine readable non-transitory medium of claim 18, further comprising:
acknowledging the voice command if the peripheral vector moves in a vertical direction with respect to a ground reference.

20. The machine readable non-transitory medium of claim 19, further comprising:
rejecting the voice command if the peripheral vector moves in a horizontal direction with respect to the ground reference.

21. A system comprising:
a peripheral;
a device for use with the peripheral;
wherein the peripheral comprises:
a peripheral interface to couple the peripheral to the device;
at least one peripheral sensor to sense a user of the peripheral;
a peripheral processor coupled to the peripheral interface and to the at least one peripheral sensor, the peripheral processor configured to determine a peripheral vector indicating an orientation of the peripheral including a direction with respect to a horizontal ground reference;
wherein the device comprises:
an interface to couple the device to the peripheral;
at least one sensor to sense the user;
a processor coupled to the interface and to the at least one sensor, the processor configured to determine a device vector indicating an orientation of the device including a direction with respect to a horizontal ground reference; initiate an audio signal associated with an event; and determine whether the peripheral vector and the device vector point towards each other in response to the audio signal.

22. The system of claim 21, wherein the processor is further configured to silence the audio signal when the peripheral vector points towards the device vector in response to the audio signal.

23. The system of claim 22, wherein the peripheral vector points towards the device vector in response to the audio signal based on the peripheral vector not pointing towards the device vector prior to the audio signal being generated.

24. The system of claim 22, wherein the processor is further configured to ignore the audio signal when the peripheral vector does not point towards the device vector in response to the audio signal.

25. The system of claim 24, wherein the peripheral vector does not point towards the device vector in response to the audio signal based on the peripheral vector pointing towards the device vector prior to and after the audio signal is generated.

26. The system of claim 21, wherein determining of the peripheral vector occurs based on a user wearing the peripheral.

27. The system of claim 21, wherein the event comprises at least one of: a calendar event, a phone call, an alarm event, a to do event, an email event, and a reminder event.

28. The system of claim 21, wherein the audio signal represents a voice command.

29. The system of claim 28, further comprising:
acknowledging the voice command if the peripheral vector moves in a vertical direction with respect to a ground reference.

30. The system of claim 28, further comprising:
rejecting the voice command if the peripheral vector moves in a horizontal direction with respect to the ground reference.

31. The system as in claim 21 wherein the peripheral interface comprises a wireless transceiver which wirelessly couples the device to the peripheral and wherein the peripheral further comprises a speaker coupled to the peripheral interface and a microphone coupled to the peripheral interface and wherein the wireless transceiver transmits first audio data from the microphone to the device and wherein the wireless transceiver receives second audio data from the device and passes the second audio data to the speaker and wherein the device comprises a wireless mobile telephone transceiver.

32. The system as in claim 31 wherein at least one of the peripheral processor and the processor receive data from at least one of the at least one peripheral sensor and the at least one sensor and determine, based on the data, whether to use the speaker and the microphone for a phone call communicated through the wireless mobile telephone transceiver.

33. The system as in claim 32 wherein the at least one peripheral sensor comprises at least one of (a) a proximity sensor; (b) an ambient light sensor; (c) a temperature sensor; (d) an accelerometer; (e) a position sensor; (f) an orientation sensor; and (g) a sound sensor; and wherein the at least one sensor comprises at least one of (a) a proximity sensor; (b) an ambient light sensor; (c) a temperature sensor; (d) an accelerometer; (e) a position sensor; (f) an orientation sensor; and (g) a sound sensor.

34. The system as in claim 33 wherein the peripheral processor configures the speaker and the microprocessor automatically in response to outputs from the at least one peripheral sensor and the at least one sensor.

35. The system as in claim 34 wherein the speaker and the microphone are enabled to provide output/input capabilities for a phone call when the at least one peripheral sensor senses that the peripheral is next to the user's ear and wherein the speaker and the microphone are not enabled to provide the output/input capabilities when the at least one sensor senses that the device is next to the user's ear.

36. The system as in claim 35 wherein the peripheral interface transmits the output from the at least one peripheral sensor to the device which processes the output from the at least one peripheral sensor and the output from the at least one sensor and determines whether to enable the speaker and the microphone and transmits an instruction to the peripheral indicating whether to enable the speaker and the microphone.

37. The system as in claim 35 wherein the peripheral processor, through the peripheral interface, receives the output from the at least one sensor and processes the output from the at least one sensor and the output from the at least one peripheral sensor to determine whether to enable the speaker and the microphone.

38. An apparatus comprising:
means for determining a device vector associated with a device, the device vector indicates an orientation of the device including a direction with respect to a horizontal ground reference;
means for determining a peripheral vector associated with a peripheral of the device, the peripheral vector indicates an orientation of the peripheral including a direction with respect to the horizontal ground reference;
means for generating an audio signal associated with an event from the device; and
means for determining whether the peripheral vector and the device vector point towards each other in response to the audio signal.

* * * * *